June 7, 1932.          C. C. WHITTAKER          1,862,129
LOCOMOTIVE CONTROL SYSTEM
Filed July 31, 1929

INVENTOR
Charles C. Whittaker.
BY
ATTORNEY

Patented June 7, 1932

1,862,129

UNITED STATES PATENT OFFICE

CHARLES C. WHITTAKER, OF PITTSBURGH, PENNSYLVANIA, ASSIGNOR TO WESTINGHOUSE ELECTRIC & MANUFACTURING COMPANY, A CORPORATION OF PENNSYLVANIA

LOCOMOTIVE CONTROL SYSTEM

Application filed July 31, 1929. Serial No. 382,457.

The invention relates to a system for dividing a load between the propelling motors of a motor vehicle.

The object of the invention, generally stated, is to provide a load distributing system that shall be simple and efficient in operation and economically installed.

A more specific object of the invention is to provide for varying the load on the propelling motors of a vehicle in accordance with changes in the distribution of weight resulting from the mechanical construction and changes in the direction of movement of the vehicle, in order to obtain a high tractive effort from the locomotive.

It is also an object of the invention to provide for effecting a change in the distribution of the load on the propelling motors of a vehicle when the motors are reversed to change the direction of movement of the vehicle.

Other objects of the invention will become obvious as the description proceeds.

The invention is disclosed in the embodiment thereof shown in the accompanying drawing and comprises the structural features, the combination of elements and arrangement of parts that will be exemplified in the structure hereinafter set forth and the scope of the application of which will be indicated in the claims.

Figure 1:
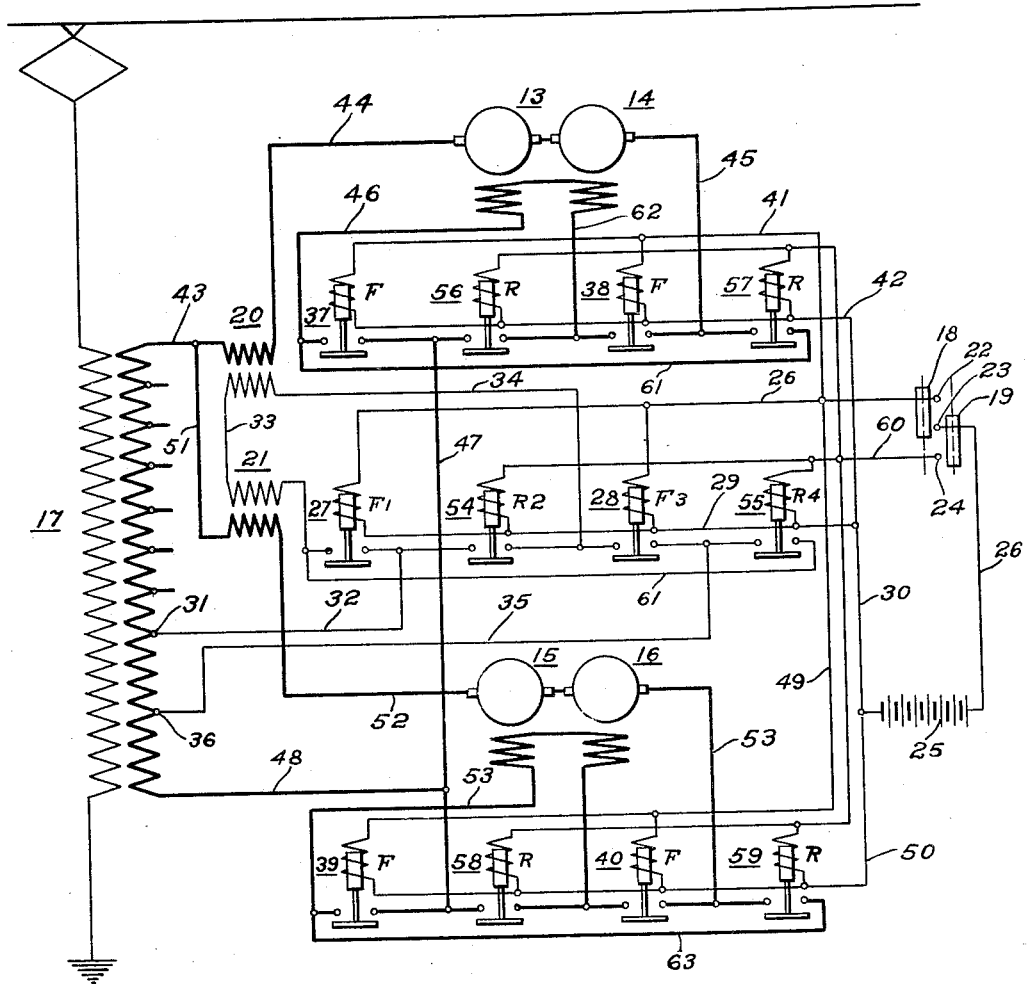
Figure 2:
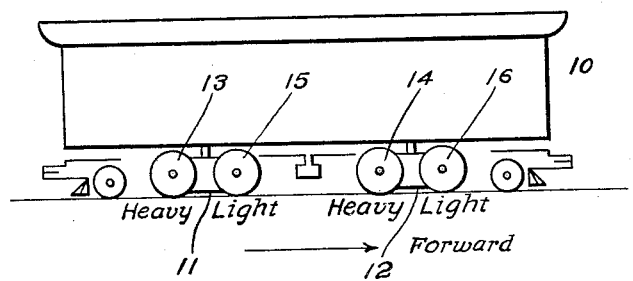

For a fuller understanding of the nature and objects of the invention, reference should be had to the following detailed description taken in connection with the accompanying drawing, in which, Figure 1 is a diagrammatic view of a control system arranged in accordance with this invention, and Fig. 2 is a diagrammatic view of a motor driven vehicle which will be referred to in order to disclose how the distribution of weight on the vehicle axles will change when the direction of movement of the vehicle is reversed.

Referring now to the drawing, and particularly to Fig. 2, it will be readily understood that the distribution of the weight of a vehicle, such as car 10 on the axles of the trucks 11 and 12, will not be the same when the car is in motion, as it is when the car is standing at rest.

In order to explain the distribution of the weight when the car is in motion, assume that it is moving to the right, as viewed in Fig. 2, then the body of the car will cause a rearward thrust on the truck pins and a greater weight will be imposed on the trailing axles 13 and 14 of the trucks than is carried by the leading axles 15 and 16. If the direction of movement of the car is reversed, then the axles 15 and 16 of the trucks 11 and 12, respectively, will become the trailing axles and will carry a greater weight than the leading axles 13 and 14.

In the operation of railway vehicles, and particularly locomotives, in order to obtain the maximum tractive effort from a locomotive of a predetermined weight, it is necessary to cause the motors driving the trailing axles which carry a greater weight than the leading axles to exert a greater torque than the motors on the leading axles. Further, when the direction of movement of the locomotive is reversed, it is necessary to provide for changing the load assumed by the different motors.

In the present control system, provision is made for supplying a greater voltage to the motors driving the trailing axles than is applied to the motors actuating the leading axles. Therefore, when the car is moving to the right as viewed in Fig. 2, a greater voltage is impressed on the motors 13 and 14 than is applied to the motors 15 and 16.

In the system illustrated, a transformer 17 of any well known type is provided for supplying current at a desired voltage to the propelling motors 13 to 16, inclusive. With a view to simplifying the drawing, the circuit connections for accelerating the motors and the controller for controlling the circuit connections have not been shown. Two contact segments 18 and 19, which would be carried by the controller drum, are the only members of the controller that have to be shown, in order to permit the giving of a complete description of the functioning of the system.

In the present system, in order to provide for imposing a greater voltage on predetermined motors than is applied to the other motors, two auxiliary transformers 20 and 21 are provided. As illustrated, the secondary windings of the transformers 20 and 21 are connected in parallel circuit relation with each other and in series circuit relation with the secondary winding of the main transformer 17, thereby providing a series parallel circuit.

The manner in which a greater voltage is applied to one pair of motors than to the remaining motors will be readily understood from the following description of the operation of the control system. Assuming now that it is desired to move the vehicle in the direction indicated by the arrow in Fig. 2, then the controller is actuated to engage the uppermost pair of the contact fingers 22 to 24, inclusive, thereby establishing a number of switch actuating circuits. One circuit established extends from the battery 25 through conductor 26, contact fingers 23 and 22 bridged by the contact segment 18, conductor 26, the actuating coils of the switches 27 and 28 connected in parallel circuit relation, and conductors 29 and 30 back to the battery. The switches 27 and 28 are closed and the transformers 20 and 21 are connected across a section of the secondary winding of the transformer 17.

The transformer circuit may be traced from the tap 31 through conductor 32, switch 27, the primary winding of the transformer 21, conductor 33, the primary winding of transformer 20, conductor 34, switch 28 and conductor 35 to the tap 36. In this manner, the secondary windings of the transformers 20 and 21 are energized one in cumulative relation and the other opposed to the voltage of the secondary winding of the transformer 17.

When the contact segment 18 is moved into engagement with the contact fingers 22 and 23, actuating circuits for the motor switches 37 and 40, inclusive, are established. The switches 37 and 38 are provided for closing the supply circuit for the motors 13 and 14. The actuating circuit for the switches 37 and 38 may be traced from the energized conductor 26 through conductor 41, the actuating coils of the switches 37 and 38 connected in parallel circuit relation and conductor 42 to the battery 25.

The switches 37 and 38 are closed and a motor circuit established which extends from one terminal of the secondary winding of the transformer 17 through the conductor 43, the secondary winding of the transformer 20, conductor 44, the armature of the motors 13 and 14, conductor 45, the switch 38, the field windings of the motors 14 and 13, conductor 46, switch 37 and conductors 47 and 48 to the other terminal of the transformer winding. Therefore, the voltage applied to the motors 13 and 14 is equal to the voltage across the secondary winding of the transformer 17 plus the voltage across the secondary winding of the transformer 20.

At the same time that switches 37 and 38 are closed, actuating circuits for the switches 39 and 40 are established and extend from the energized conductor 26 through conductor 49, the actuating coils of the switches 39 and 40 connected in parallel circuit relation and conductor 50 to the battery 25. Switches 39 and 40 are closed, establishing a supply circuit for the motors 15 and 16.

The supply circuit for the motors 15 and 16 may be traced from one terminal of the transformer 17 through conductors 43 and 51, the secondary winding of transformer 21, conductor 52, the armature of motors 15 and 16, conductor 53, switch 40, the field windings of motors 15 and 16, conductors 53, switch 39 and conductor 48 back to the secondary winding of transformer 17. As pointed out hereinbefore, the secondary winding of the transformer 21 is disposed to oppose the voltage of the secondary winding of the transformer 17. Therefore, the voltage applied to the motors 15 and 16 is the voltage across the secondary of the transformer 17 minus the voltage of the secondary winding of the transformer 21.

Therefore, when the controller is actuated to move the vehicle in the direction of the arrow of Fig. 2, a greater voltage is applied to the motors 13 and 14 on the trailing axles of the trucks 11 and 12, respectively, than is applied to the motors 15 and 16 on the leading axles. In this instance, the voltage applied to one group of motors is greater than the voltage across the secondary of the transformer 17, while the voltage imposed on the others is less.

In order to reverse the direction of movement of the vehicle 10, the controller is reversed, actuating the contact segment 18 out of engagement with the contact fingers 22 and 23 and causing the contact segment 19 to bridge the contact fingers 23 and 24. The actuating circuits of the switches 27 and 28 and 37 to 40, inclusive, are interrupted, and actuating circuits for switches 54 to 59, inclusive, are established.

The actuating circuits for the switches 54 and 55 may be traced from the energized conductor 26 through the contact fingers 23 and 24 bridged by the contact segment 19, conductor 60, the actuating coils of the switches 54 and 55 connected in parallel circuit relation, and conductor 30 to the battery 25. In this manner, the connections of the auxiliary transformers 20 and 21 across the section of the secondary winding of the transformer 17 are reversed. The energizing circuit of the transformers 20 and 21 now extends from the tap 31 through conductor 32, switch 54, conductor 34, primary winding of the transformer 20, conductor 33, the primary winding of transformer 21, conductor 61, switch 55, and conductor 35 to the tap 36.

Further, when the contact fingers 23 and 24 are bridged by the contact segment 19, actuating circuits for the switches 56 to 59, inclusive, are established. The actuating circuits for the switches 56 and 57 extend from the energized conductor 60 through the actuating coils of switches 56 and 57 and conductor 42 to the battery 25, while the actuating circuits for the switches 58 and 59 extend from energized conductor 60 through the actuating coils of the switches 58 and 59 and conductor 50 to the battery 25.

Therefore, the switches 56 to 59, inclusive, are closed and motor circuits established. The supply circuits for the motors 13 and 14 extend from the secondary winding of the transformer 17 through conductor 43, secondary winding of the transformer 20, conductor 44, the armatures of the motors 13 and 14, conductor 45, switch 57, conductors 61 and 46, the field windings of the motors 13 and 14, respectively, conductor 62, switch 56 and conductors 47 and 48 to the other terminal of the secondary winding transformer 17. Since the voltage of the transformer 20 is opposed to the voltage of the secondary winding transformer 17, the voltage applied to the motors 13 and 14 will be less than the voltage across the secondary winding.

The other motor circuit extends from one terminal of the secondary winding to the transformer 17 through conductors 43 and 51, secondary winding of transformer 21, conductor 52, the armatures of the motors 15 and 16, conductor 53, switch 59, conductors 63 and 53, the field windings of the motors 15 and 16, respectively, switch 58 and conductor 48 to the other terminal of the transformer winding. Therefore, the voltage applied to the motors 15 and 16 is equal to the voltage across the secondary winding of the transformer 17 plus the voltage of the secondary winding of the auxiliary transformer 21.

It will, therefore, be readily understood that irrespective of the direction in which the vehicle 10 is moved, provision is made for applying a greater voltage to the motors on the trailing axles than to the motors disposed to actuate the leading axles. Further, the auxiliary transformers 20 and 21 may be designed to increase or decrease the voltage of the secondary winding of transformer 17 by a predetermined amount, so that the maximum tractive effort of the locomotive may be obtained.

If the load on the motors is distributed in accordance with the distribution of the load on the axles, then the tractive effort obtained will be a maximum for the weight of the locomotive. If this distribution of the weight on the axles and the load on the motor could be worked out in practice to theoretical perfection, then all the wheels would slip at once, provided the load the motors are capable of handling is greater than the traction resulting from the weight of the load and the co-efficient of friction between the wheels and the rails.

Various modifications may be made in the system herein disclosed without departing from the spirit and the scope of my invention. It is desired, therefore, that the specific embodiment of my invention shall be interpreted in an illustrative, but not in a limiting sense.

I claim as my invention:

1. In a motor driven vehicle provided with a plurality of driving axles and a propelling motor for rotating each driving axle, in combination, a power source for operating the motors, means for controlling the operation of the motors, and means disposed to be actuated in conjunction with said control means for varying the voltage applied to the motors from the power source for effecting the application of a higher voltage to the motor on the trailing axle than to the motor on the leading axle.

2. In a motor driven vehicle provided with a plurality of driving axles and a motor for rotating each driving axle, in combination, a power source for operating the motors, means for controlling the operation of the motors, and means disposed to be actuated in conjunction with the control means for varying the voltage applied to the motors from the power source for effecting the application of a higher voltage to the motor on the axle carrying the greater weight.

3. In a motor-driven vehicle provided with a plurality of driving axles and a motor for rotating each driving axle, in combination, a power source, means for connecting the motors to the power source and controlling their operation, and means disposed to be actuated in conjunction with the control means for increasing the voltage applied to the motor carried by the trailing axle and decreasing the voltage applied to the motor carried by the leading axle relative to the voltage of the power source when the direction of the vehicle is changed, thereby changing the weight imposed on the axles.

4. In a motor driven vehicle provided with a plurality of driving axles and an individual motor for rotating each of the driving axles, in combination, a power source, means for connecting the motors to the power source, a transformer connected in series circuit with each motor, means actuated in response to the operation of the means for connecting the motors to the power source for causing the energization of the transformers to increase the voltage applied to one motor and decrease the voltage to another motor.

5. In a motor driven vehicle provided with a plurality of driving axles and a motor for rotating each driving axle, in combination, means for controlling the operation of the motors, a transformer connected in series with each motor and means for reversing the voltage applied to the transformers disposed to be actuated by the control means to effect the application of a greater voltage to the motor mounted on the axle carrying the greater load.

6. In a motor driven vehicle provided with a plurality of driving axles and an individual motor for rotating each of the driving axles, in combination, a controller for controlling the operation of the motors, a transformer connected in series with each motor, said transformers being disposed to increase the voltage of one motor and decrease the voltage of another motor and means actuated in response to the operation of the controller to effect the energization of the transformers.

7. In a motor driven vehicle provided with a plurality of driving axles and a motor for operating each driving axle, in combination, a source of power for the motors, a controller for connecting the motors to the source of power, a transformer connected in series with each motor, said transformers being disposed to increase the voltage applied to one motor and decrease the voltage applied to the other motor relative to the voltage of the source of supply and means actuated in response to the operation of the controller to effect the energization of said transformer.

8. In a motor driven vehicle provided with a plurality of driving axles and a motor for operating each driving axle, in combination, a source of power for the motors, a controller for connecting the motors to the source of power, a transformer connected in series with each motor, said transformers being disposed to increase the voltage applied to one motor and decrease the voltage applied to the other motor relative to the voltage of the source of power, and means disposed to be actuated upon the operation of the controller to effect the energization of the transformers, said means being disposed to cause a reversal of the voltage when the controller is actuated to reverse the motors.

9. In a motor driven vehicle provided with a plurality of driving axles and an individual motor for rotating each of the driving axles, in combination, a transformer for supplying power to said motors, a controller for connecting the motors to the transformer, means interposed between the motors and the transformer for decreasing the voltage applied to the leading axle and increasing the voltage applied to the trailing axle relative to the transformer voltage, and means disposed to be actuated by the controller to cause the functioning of said voltage-varying means to effect the application of the desired voltage to the motors.

In testimony whereof, I have hereunto subscribed my name this 24th day of July, 1929.

CHARLES C. WHITTAKER.